United States Patent
Roychoudhury

(10) Patent No.: US 9,254,808 B2
(45) Date of Patent: Feb. 9, 2016

(54) ACTIVE BOLSTER ASSEMBLY

(75) Inventor: Raj S. Roychoudhury, Bloomfield Hills, MI (US)

(73) Assignee: Salflex Polymers Limited, Weston, ON (CA)

( * ) Notice: Subject to any disclaimer, the term of this patent is extended or adjusted under 35 U.S.C. 154(b) by 0 days.

(21) Appl. No.: 13/984,021

(22) PCT Filed: Feb. 6, 2012

(86) PCT No.: PCT/US2012/023926
§ 371 (c)(1),
(2), (4) Date: Aug. 21, 2013

(87) PCT Pub. No.: WO2012/109122
PCT Pub. Date: Aug. 16, 2012

(65) Prior Publication Data
US 2013/0328291 A1    Dec. 12, 2013

Related U.S. Application Data

(60) Provisional application No. 61/440,232, filed on Feb. 7, 2011.

(51) Int. Cl.
*B60R 21/20* (2011.01)
*B60R 21/02* (2006.01)
*B60R 21/00* (2006.01)

(52) U.S. Cl.
CPC ............... *B60R 21/20* (2013.01); *B60R 21/02* (2013.01); *B60R 2021/0051* (2013.01); *B60R 2021/0273* (2013.01)

(58) Field of Classification Search
CPC ............ B60R 21/02; B60R 2021/0273; B60R 2021/0051; B60R 21/08; B60R 2021/23169; B60R 21/209; B60R 21/045
USPC .................... 280/753, 728.2, 730.1, 731, 752
See application file for complete search history.

(56) References Cited

U.S. PATENT DOCUMENTS

| | | | |
|---|---|---|---|
| 2,834,606 A | 5/1958 | Bertrand |
| 3,185,497 A | 5/1965 | Lagace |
| 3,473,824 A | 10/1969 | Carey |
| 3,963,362 A | 6/1976 | Hollis |
| 3,981,518 A | 9/1976 | Pulling |
| 4,203,616 A | 5/1980 | Okada |
| 4,297,051 A | 10/1981 | Robinson |
| 4,362,425 A | 12/1982 | Dixon |

(Continued)

FOREIGN PATENT DOCUMENTS

| | | |
|---|---|---|
| AT | 404746 | 2/1999 |
| DE | 1112266 B | 8/1961 |

(Continued)

*Primary Examiner* — Karen Beck
(74) *Attorney, Agent, or Firm* — Medler Ferro PLLC

(57) ABSTRACT

An inflatable active bolster for a vehicle occupant, the active bolster comprising a front wall and a rear wall, the front and rear walls being interconnected to form a hollow chamber. The front wall has deformable features that permit the hollow chamber to volumetrically expand upon inflation of the hollow chamber by an inflator. The active bolster further includes a reaction plate for attachment of the active bolster to a suitable vehicle mount structure. The hollow chamber is attached to the reaction plate through a releasable engagement mechanism. The active bolster provides for snap-in installation, and easier detachment for servicing.

8 Claims, 10 Drawing Sheets

(56) References Cited

U.S. PATENT DOCUMENTS

| | | | |
|---|---|---|---|
| 4,511,281 A | 4/1985 | Schmanski | |
| 4,518,172 A | 5/1985 | Bortz et al. | |
| 4,597,691 A | 7/1986 | Clarke | |
| 4,709,943 A | 12/1987 | Yoshimura et al. | |
| 4,721,329 A | 1/1988 | Brantman et al. | |
| 4,951,963 A | 8/1990 | Behr et al. | |
| 5,082,310 A | 1/1992 | Bauer | |
| 5,138,721 A | 8/1992 | Spector | |
| 5,273,309 A | 12/1993 | Lau et al. | |
| 5,312,133 A | 5/1994 | Pietila et al. | |
| 5,324,070 A | 6/1994 | Kitagawa et al. | |
| 5,324,072 A | 6/1994 | Olson et al. | |
| 5,364,125 A | 11/1994 | Brown et al. | |
| 5,370,417 A | 12/1994 | Kelman et al. | |
| 5,382,051 A | 1/1995 | Glance | |
| 5,447,326 A | 9/1995 | Laske et al. | |
| 5,456,490 A | 10/1995 | Carter et al. | |
| 5,458,366 A | 10/1995 | Hock et al. | |
| 5,476,283 A | 12/1995 | Elton | |
| 5,498,026 A | 3/1996 | Eckhout | |
| 5,524,924 A | 6/1996 | Steffens, Jr. et al. | |
| 5,533,748 A | 7/1996 | Wirt et al. | |
| 5,536,043 A | 7/1996 | Lang et al. | |
| 5,544,913 A | 8/1996 | Yamanishi et al. | |
| 5,549,327 A | 8/1996 | Rusche et al. | |
| 5,556,128 A | 9/1996 | Sinnhuber et al. | |
| 5,567,375 A | 10/1996 | Filion et al. | |
| 5,615,914 A | 4/1997 | Galbraith et al. | |
| 5,630,621 A | 5/1997 | Schneider | |
| 5,716,093 A | 2/1998 | Sadr | |
| 5,718,449 A | 2/1998 | Numazawa et al. | |
| 5,775,729 A | 7/1998 | Schneider et al. | |
| 5,816,613 A | 10/1998 | Specht et al. | |
| 5,845,937 A | 12/1998 | Smith | |
| 5,865,468 A | 2/1999 | Hur | |
| 5,927,755 A | 7/1999 | Matsuo et al. | |
| D412,880 S | 8/1999 | Sadr | |
| 5,931,493 A | 8/1999 | Sutherland | |
| 5,957,493 A | 9/1999 | Larsen et al. | |
| 5,967,594 A | 10/1999 | Ramanujam | |
| 5,968,431 A | 10/1999 | Ang et al. | |
| 6,032,978 A | 3/2000 | Spencer et al. | |
| 6,039,380 A * | 3/2000 | Heilig et al. | 296/70 |
| 6,092,832 A * | 7/2000 | Worrell et al. | 280/728.2 |
| 6,131,950 A | 10/2000 | Schroter | |
| 6,142,520 A | 11/2000 | Iino et al. | |
| 6,158,766 A | 12/2000 | Kowalski | |
| 6,170,871 B1 | 1/2001 | Goestenkors et al. | |
| 6,193,272 B1 | 2/2001 | Aigner et al. | |
| 6,196,573 B1 * | 3/2001 | Worrell et al. | 280/728.2 |
| 6,203,057 B1 | 3/2001 | Spencer et al. | |
| 6,213,497 B1 | 4/2001 | Spencer et al. | |
| 6,231,072 B1 | 5/2001 | Pywell et al. | |
| 6,250,665 B1 | 6/2001 | Sutherland et al. | |
| 6,270,131 B1 | 8/2001 | Martinez et al. | |
| 6,299,209 B1 | 10/2001 | Ankersson et al. | |
| 6,302,437 B1 | 10/2001 | Marriott et al. | |
| 6,305,710 B1 | 10/2001 | Bosgieter et al. | |
| 6,336,653 B1 | 1/2002 | Yaniv et al. | |
| 6,338,501 B1 | 1/2002 | Heilig et al. | |
| 6,416,079 B1 | 7/2002 | Lutz et al. | |
| 6,435,554 B1 | 8/2002 | Feldman | |
| 6,471,242 B2 | 10/2002 | Schneider | |
| 6,517,103 B1 | 2/2003 | Schneider | |
| 6,536,802 B1 | 3/2003 | Sutherland et al. | |
| 6,543,838 B1 | 4/2003 | Bertolini et al. | |
| 6,568,743 B1 | 5/2003 | Jayasuriya et al. | |
| 6,578,867 B2 | 6/2003 | Khoudari et al. | |
| 6,588,557 B2 | 7/2003 | Williams et al. | |
| 6,619,689 B2 | 9/2003 | Spencer et al. | |
| 6,675,675 B1 * | 1/2004 | Sauer et al. | 74/552 |
| 6,688,643 B2 | 2/2004 | Schneider | |
| 6,712,385 B2 * | 3/2004 | Enders | 280/730.1 |
| 6,715,789 B2 | 4/2004 | Takimoto et al. | |
| 6,752,417 B2 | 6/2004 | Takimoto et al. | |
| 6,758,493 B2 | 7/2004 | Conlee et al. | |
| 6,817,625 B2 | 11/2004 | Hjerpe | |
| 6,817,627 B2 | 11/2004 | Galmiche et al. | |
| 6,848,715 B2 | 2/2005 | Nelson et al. | |
| 6,874,811 B2 | 4/2005 | Enders et al. | |
| 6,951,348 B2 * | 10/2005 | Enders | 280/728.2 |
| 6,971,667 B2 * | 12/2005 | Enders et al. | 280/730.1 |
| 6,976,706 B2 | 12/2005 | Smith et al. | |
| 6,991,252 B2 | 1/2006 | Enders | |
| 7,021,652 B2 | 4/2006 | Kumagai et al. | |
| 7,055,083 B2 | 5/2006 | Wang | |
| 7,055,853 B2 | 6/2006 | Honda et al. | |
| 7,086,663 B2 | 8/2006 | Honda | |
| 7,093,846 B2 | 8/2006 | Reiter et al. | |
| 7,093,851 B2 | 8/2006 | Lotspih | |
| 7,144,032 B2 * | 12/2006 | Lunt et al. | 280/728.2 |
| 7,168,733 B2 | 1/2007 | Kumagai et al. | |
| 7,213,840 B2 | 5/2007 | Kumagai | |
| 7,249,781 B2 | 7/2007 | Kai et al. | |
| 7,322,598 B2 | 1/2008 | Galmiche et al. | |
| 7,350,852 B2 | 4/2008 | Rust et al. | |
| 7,367,587 B2 | 5/2008 | Taoka | |
| 7,393,013 B2 | 7/2008 | Best et al. | |
| 7,396,040 B2 | 7/2008 | Enders et al. | |
| 7,413,215 B2 | 8/2008 | Weston et al. | |
| 7,422,234 B2 | 9/2008 | Huber et al. | |
| 7,448,645 B2 | 11/2008 | Bederka et al. | |
| 7,481,457 B2 | 1/2009 | Best et al. | |
| 7,552,519 B2 * | 6/2009 | Enders | 280/728.2 |
| 7,556,281 B2 * | 7/2009 | Olesko et al. | 280/728.2 |
| 7,568,722 B2 | 8/2009 | Sato et al. | |
| 7,578,518 B2 | 8/2009 | Ochiai et al. | |
| 7,735,865 B2 | 6/2010 | Cappabianca et al. | |
| 7,874,587 B2 | 1/2011 | Miki et al. | |
| 7,967,327 B2 * | 6/2011 | Kim | 280/728.2 |
| 7,980,589 B2 | 7/2011 | Best et al. | |
| 8,146,943 B2 | 4/2012 | Fukawatase et al. | |
| 8,205,909 B2 | 6/2012 | Kalisz | |
| 8,308,186 B1 | 11/2012 | Orlowsky et al. | |
| 8,328,230 B1 | 12/2012 | Kalisz | |
| 8,336,910 B1 | 12/2012 | Kalisz et al. | |
| 8,388,020 B2 * | 3/2013 | Ciplijauskas et al. | 280/743.1 |
| 8,491,008 B2 | 7/2013 | Roychoudhury et al. | |
| 8,579,325 B2 * | 11/2013 | Roychoudhury | 280/752 |
| 2001/0052210 A1 | 12/2001 | Mizutani et al. | |
| 2001/0054811 A1 | 12/2001 | Spencer et al. | |
| 2002/0125691 A1 | 9/2002 | Conlee et al. | |
| 2002/0171231 A1 | 11/2002 | Takimoto et al. | |
| 2003/0127819 A1 | 7/2003 | Richardson | |
| 2003/0197354 A1 | 10/2003 | Beland et al. | |
| 2004/0007856 A1 | 1/2004 | Enders et al. | |
| 2004/0075251 A1 | 4/2004 | Fujii et al. | |
| 2004/0075252 A1 | 4/2004 | Pan | |
| 2004/0099644 A1 | 5/2004 | Allen | |
| 2004/0100075 A1 | 5/2004 | Sakai et al. | |
| 2004/0135353 A1 * | 7/2004 | Enders et al. | 280/730.1 |
| 2004/0145163 A1 | 7/2004 | Galmiche et al. | |
| 2004/0155447 A1 | 8/2004 | Smith et al. | |
| 2004/0163872 A1 | 8/2004 | Lincoln et al. | |
| 2004/0163873 A1 | 8/2004 | Polz et al. | |
| 2004/0178616 A1 | 9/2004 | Yoshikawa | |
| 2004/0232666 A1 | 11/2004 | Sato et al. | |
| 2005/0023802 A1 | 2/2005 | Enders et al. | |
| 2005/0029781 A1 | 2/2005 | Enders et al. | |
| 2005/0052005 A1 | 3/2005 | Lunt et al. | |
| 2005/0052010 A1 | 3/2005 | Best et al. | |
| 2005/0052011 A1 | 3/2005 | Best et al. | |
| 2005/0057024 A1 | 3/2005 | Weston et al. | |
| 2005/0073134 A1 | 4/2005 | Matsuura et al. | |
| 2005/0098996 A1 | 5/2005 | Enders | |
| 2005/0116449 A1 * | 6/2005 | Enders | 280/730.1 |
| 2005/0253369 A1 | 11/2005 | Taoka | |
| 2006/0214400 A1 | 9/2006 | Enders et al. | |
| 2007/0007753 A1 | 1/2007 | Williams et al. | |
| 2007/0052219 A1 | 3/2007 | Rust et al. | |
| 2007/0108746 A1 | 5/2007 | Ochiai et al. | |
| 2007/0108747 A1 | 5/2007 | Roychoudhury et al. | |
| 2007/0152431 A1 | 7/2007 | Rust et al. | |
| 2007/0273179 A1 | 11/2007 | Hommel et al. | |

(56) References Cited

U.S. PATENT DOCUMENTS

| | | |
|---|---|---|
| 2007/0296187 A1 | 12/2007 | Ochiai |
| 2008/0061537 A1 | 3/2008 | Enders |
| 2008/0203714 A1 | 8/2008 | Untersinger et al. |
| 2009/0045613 A1 | 2/2009 | Baldwin |
| 2009/0152848 A1 | 6/2009 | Sadr et al. |
| 2009/0152849 A1 | 6/2009 | Saraf et al. |
| 2009/0250915 A1 | 10/2009 | Best et al. |
| 2010/0052296 A1 | 3/2010 | Sasaki et al. |
| 2010/0194081 A1 | 8/2010 | Thomas et al. |
| 2010/0295285 A1 | 11/2010 | Dei et al. |
| 2010/0320736 A1 | 12/2010 | Traber et al. |
| 2010/0327566 A1 | 12/2010 | Matsushima |
| 2011/0109064 A1* | 5/2011 | Best et al. .................. 280/728.2 |
| 2011/0115201 A1 | 5/2011 | Best et al. |
| 2011/0123739 A1 | 5/2011 | Ciplijauskas et al. |
| 2011/0133435 A1 | 6/2011 | Sadr et al. |
| 2011/0156378 A1 | 6/2011 | Matsushima et al. |
| 2011/0198827 A1 | 8/2011 | Roychoudhury |
| 2012/0080871 A1 | 4/2012 | Roychoudhury et al. |
| 2012/0248741 A1 | 10/2012 | Kalisz |
| 2012/0267878 A1 | 10/2012 | Kalisz et al. |
| 2013/0328291 A1 | 12/2013 | Roychoudhury |

FOREIGN PATENT DOCUMENTS

| | | |
|---|---|---|
| DE | 3737081 A1 | 5/1989 |
| DE | 19546143 A1 | 6/1997 |
| DE | 10123207 C1 | 7/2002 |
| DE | 19858520 C5 | 3/2004 |
| EP | 274535 A1 | 7/1988 |
| EP | 678425 A1 | 10/1995 |
| EP | 684164 A1 | 11/1995 |
| EP | 872390 A1 | 10/1998 |
| EP | 1426249 A1 | 6/2004 |
| EP | 1663725 B1 | 12/2009 |
| GB | 2272670 B | 4/1996 |
| GB | 2335171 | 9/1999 |
| JP | 57058532 A | 4/1982 |
| JP | 63002741 A | 1/1988 |
| JP | 63207744 A | 8/1988 |
| JP | 282946 U | 6/1990 |
| JP | 2249740 A | 10/1990 |
| JP | 5016758 A | 1/1993 |
| JP | 637011 U | 5/1994 |
| JP | 7291084 A | 11/1995 |
| JP | 8258604 A | 10/1996 |
| JP | 10504784 A | 5/1998 |
| JP | 10512210 A | 11/1998 |
| JP | 10-329636 | 12/1998 |
| JP | 11028998 A | 2/1999 |
| JP | 11091454 A | 4/1999 |
| JP | 11334515 A | 12/1999 |
| JP | 2000006751 A | 1/2000 |
| JP | 2000326810 A | 11/2000 |
| JP | 2002522286 A | 7/2002 |
| JP | 2003517966 A | 6/2003 |
| JP | 2004026126 A | 1/2004 |
| JP | 2004182231 A | 7/2004 |
| JP | 2004249960 A | 9/2004 |
| JP | 2004338677 A | 12/2004 |
| JP | 2005-297580 | 10/2005 |
| JP | 2007504050 A | 3/2007 |
| JP | 2007090954 A | 4/2007 |
| JP | 04083653 B2 | 4/2008 |
| JP | 04136876 B2 | 8/2008 |
| WO | 2000007851 A2 | 2/2000 |
| WO | 2000050270 A1 | 8/2000 |
| WO | 2004071818 A1 | 8/2004 |
| WO | 2007056849 A1 | 5/2007 |
| WO | 2009124394 A1 | 10/2009 |
| WO | 2009124395 A1 | 10/2009 |
| WO | 2009124401 A1 | 10/2009 |
| WO | 2009132990 A1 | 11/2009 |

* cited by examiner

ACTIVE BOLSTER ASSEMBLY

CROSS-REFERENCE TO RELATED APPLICATIONS

This application claims benefit under 35 U.S.C. 119(e) to U.S. Provisional Patent Application No. 61/440232, filed Feb. 7, 2011, entitled "Knee Bolster Assembly," which is incorporated by reference herein in its entirety.

FIELD OF THE INVENTION

The present invention relates to inflatable vehicle protective devices, and more particularly to an inflatable knee bolster having a configuration that is attachable/detachable to facilitate serviceability.

BACKGROUND OF THE INVENTION

Several types of devices have been proposed for protecting vehicle occupants during a crash event. Such devices can be categorized as being either passive devices or active devices.

Passive safety devices deform to absorb energy during a crash event. Passive devices, however, remain in a fixed position during a crash event. Accordingly, there may be a relatively large distance over which the vehicle occupant may travel during a crash event before encountering a passive device.

Active safety devices are those that deploy during a crash event so that they are positioned relatively close to the vehicle occupants to cushion them. By reducing the distance between the occupant and the safety device, the occupant has less time to travel before encountering the safety device, and more time to decelerate on engaging the safety device, and therefore is likely to sustain less injury. A typical active safety device incorporates an air bag that inflates during a crash event. The air bag is typically a fabric bag that is folded and held in a housing until it is deployed. Air bag devices, however, add complexity and cost to the vehicular subassemblies to which they are added.

For some applications, inflatable active bolsters have been developed to enhance vehicle occupant protection in the event of a vehicle crash. Such bolsters are mounted within a vehicle compartment and include a metal or polymeric hollow chamber and an inflator for injecting a fluid into the hollow chamber. In order to reduce the potential for injuries from impacting the vehicle interior, the inflator is activated upon detection of such an event, and the bolster is inflated to form a cushion.

Inflatable active bolsters are largely comprised of non-moving parts, and are generally quite rugged in construction. Nevertheless, there may be occasions when it becomes necessary to service certain active bolster components, for example the inflator, the electrical harness and/or associated electrical connectors. In general, active bolsters are constructed in a way that does not permit for easy access to the internal components once the active bolster is installed in the vehicle. In fact, active bolster systems have necessitated a more robust mounting methodology as compared to passive bolster systems. While passive bolster systems have generally been installed through the use of suitable clips, the attachment force provided by such clips are insufficient to withstand the deployment loads experienced with active bolsters. As such, inflatable active bolster systems are generally installed in the instrument panel using robust fasteners, for example threaded fasteners. In many instances, active bolster installation is performed on the instrument panel outside the vehicle. Subsequent removal of the active bolster is a tedious and time consuming process as access to the front of the instrument panel is limited.

As such, there exists the need for an alternate active bolster configuration that permits for easier in-vehicle assembly, as well as flexibility and accessibility with respect to periodic servicing.

SUMMARY OF THE INVENTION

According to an aspect of an embodiment, provided is an inflatable active bolster for a vehicle occupant, the active bolster comprising a front wall and a rear wall, the front and rear walls being interconnected to form a hollow chamber. The front wall has deformable features that permit the hollow chamber to volumetrically expand upon inflation of the hollow chamber by an inflator. The active bolster further includes a reaction plate for attachment of the active bolster to a suitable vehicle mount structure. The hollow chamber is attached to the reaction plate through a releasable engagement mechanism.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the serviceable bolster in the form of an active knee bolster, the invention may also be used in other active bolster applications, for example active side bolsters. Furthermore, there is no intention to be bound by any expressed or implied theory presented in the preceding technical field, background, brief summary or the following detailed description.

Active bolster systems generally include an inflatable hollow chamber or bladder having a front panel and a rear panel. The hollow chamber may be a multi-piece structure formed of injection molded parts, or alternatively be a unitary single-piece structure formed through the process of blow molding. As will be appreciated, alternate molding methodologies may also be implemented as deemed suitable to construct the hollow chamber. In a knee bolster application such as that described herein, the front panel generally faces the front of the vehicle, while the rear panel generally faces the rear of the vehicle. As such, it is the rear panel that generally faces the vehicle occupant. As will be appreciated, depending on the configuration of the active bolster, there will be variants to this arrangement, such as when configured for a side-bolster application. Between the hollow chamber and the vehicle frame, that is forwardly and adjacent the front panel of the hollow chamber, there is generally provided a reaction plate. The reaction plate is a rigid material such as, but not limited to, plastic, metal or composite. For example, the reaction plate may be a steel material. The reaction plate serves to limit the extent of bolster deployment in the forward direction, so as to increase the extent of bolster deployment in the rearward direction, that is towards the vehicle occupant. As will be described in greater detail below, in the embodiments detailed herein, the active bolster system also includes a releasable engagement mechanism to release the hollow chamber from the reaction plate, permitting servicing when necessary.

Figure 1:
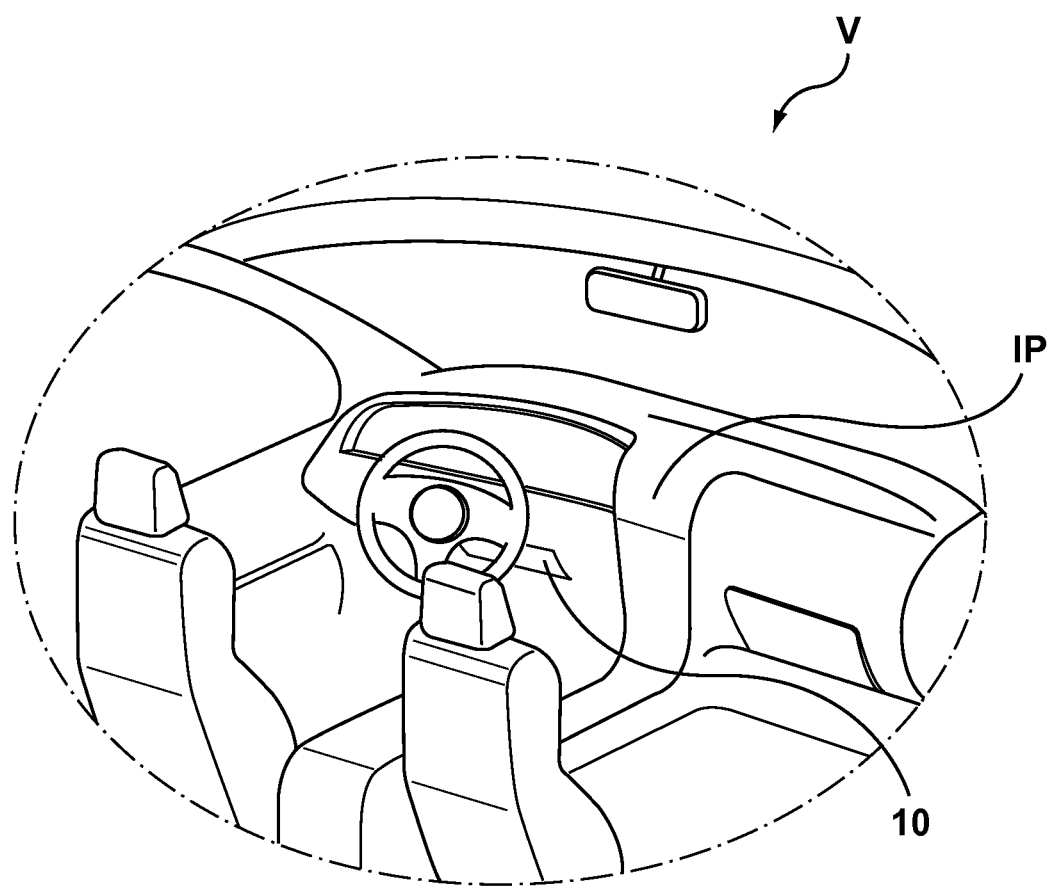
FIG. 1 is a perspective view of an active bolster system in a vehicle in its unexpanded state according to one exemplary embodiment.

Turning now to FIG. 1, shown is a vehicle V having an instrument panel IP and a safety system comprising an active bolster 10. Active bolster 10 is an active safety device forming part or all of an energy management system or safety system of vehicle V. Active bolster 10 is disposed proximate, and may be attached to instrument panel IP. Active bolster 10, may be installed so as to appear as an integral part of instrument panel IP. As such, in a non-expanded state, active bolster 10 may appear generally flush with instrument panel IP. Upon activation, a portion of active bolster 10 expands (i.e., moves distally) away from instrument panel IP towards the occupant. The deployed active bolster serves to absorb kinetic energy from the occupant, or more generally from any moving object in a controlled manner so as to reduce peak deceleration in a crash event, when the vehicle is suddenly decelerated.

Deployment of active bolster 10 may occur upon the detection of a deceleration event (e.g., when vehicle V runs into an object) or a sudden acceleration event (e.g., when vehicle V is contacted from the rear by another vehicle). Sensors (not shown), such as accelerometers, are provided for vehicle V to detect rapid changes in velocity indicative of a crash event. An electronic control unit (ECU), computer or processor, or other means is provided to receive and interpret the signals from the sensors and provide a control signal to initiate active bolster 10 deployment/inflation via an inflator in fluid communication with the hollow chamber. The ECU may also receive and process signals from other safety related sensors such as, for example, occupant sensors, crash sensors (e.g., magnetic, pressure and/or acceleration) pre-crash sensors (e.g., radar and/or vision sensors). The ECU may also be configured to perform occupant classification and crash detection determinations in order to determine whether to initiate, modify or suppress activation of the bolster.

Figure 2:
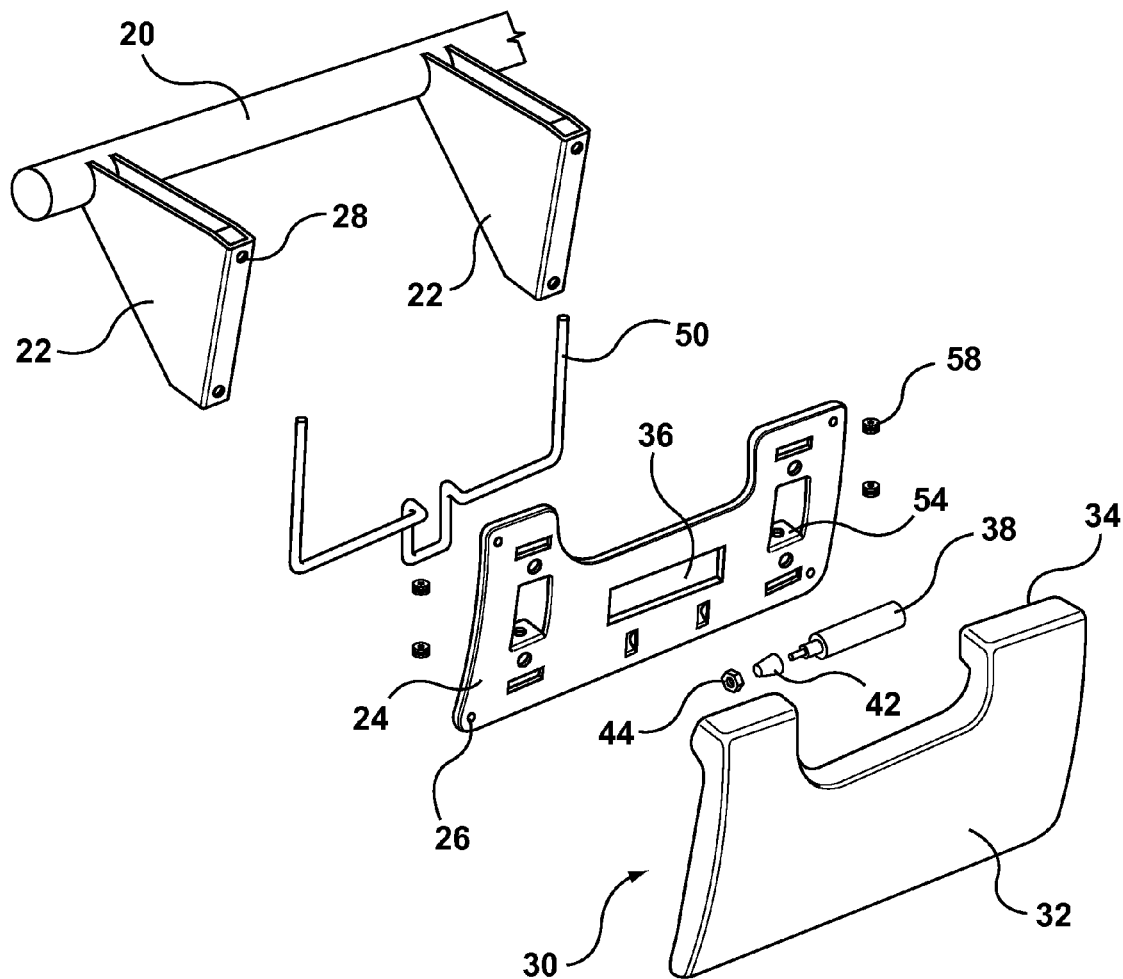
FIG. 2 is an exploded perspective view of an active bolster in relation to a vehicle mount structure.
Figure 3:
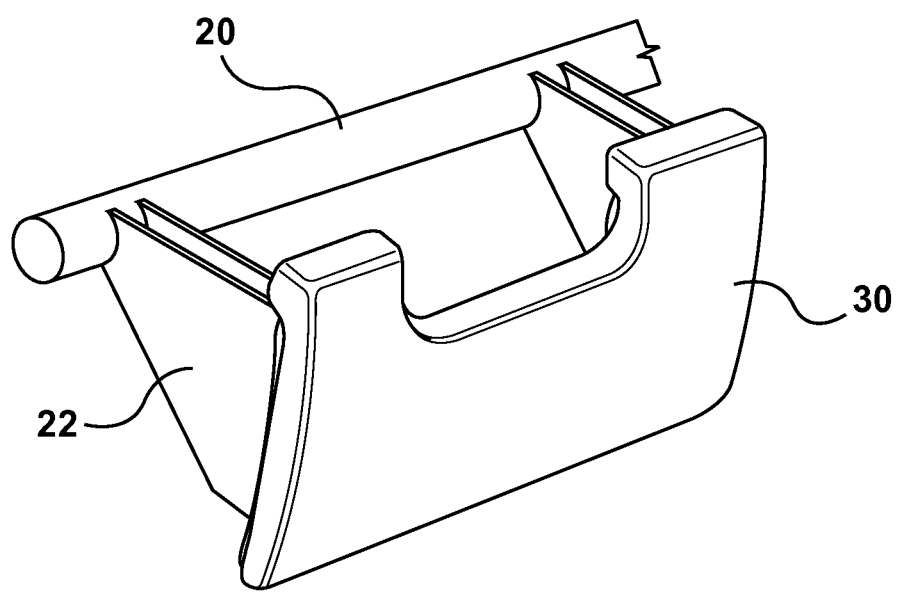
FIG. 3 is a perspective view of an assembled active bolster in relation to a vehicle mount structure.

FIG. 2 discloses an exploded rear view of active bolster 10 relative to a vehicle mounting structure. In the vehicle, active bolster 10 is mounted to a rigid surface, for example the vehicle frame structure. When provided in the form of an active knee bolster, active bolster 10 is generally mounted to the vehicle cross-bar beam 20 through one or more brackets 22. In the embodiment shown, the reaction plate 24 is attached to two brackets 22 by aligning holes 26 of reaction plate 24 with respective holes 28 of each bracket 22, and using a suitable fastener (not shown) therethrough. For example, a suitable fastener may include a nut and bolt combination. In alternate embodiments, brackets 22 may be formed as part of reaction plate 24, or separately formed and metallurgically bonded (e.g. welded) thereto. Hollow chamber 30, which includes rear panel 32 and front panel 34 is mounted to reaction plate 24, so as to provide the assembled active bolster system shown in FIG. 3. Front panel 34 of hollow chamber 30 has mounted thereon a suitable inflator 38 for inflating hollow chamber 30 upon a crash event. An opening 36 is provided on reaction plate 24 to accommodate inflator 38 and associated inflator mounting structure on front panel 34. Where rear panel 32 is configured to face the occupant, it may be provided with a finished surface. As such, rear panel 32 may be provided with a desired grain, gloss and/or finish according to appearance requirements of the interior of the vehicle.

To facilitate attachment of hollow chamber 30 to reaction plate 24, a suitable engagement mechanism is provided. To facilitate the detachment of hollow chamber 30 from reaction plate 24 when servicing is necessary, the engagement mechanism is configured as a releasable engagement mechanism as will be described in greater detail below.

Figure 4:
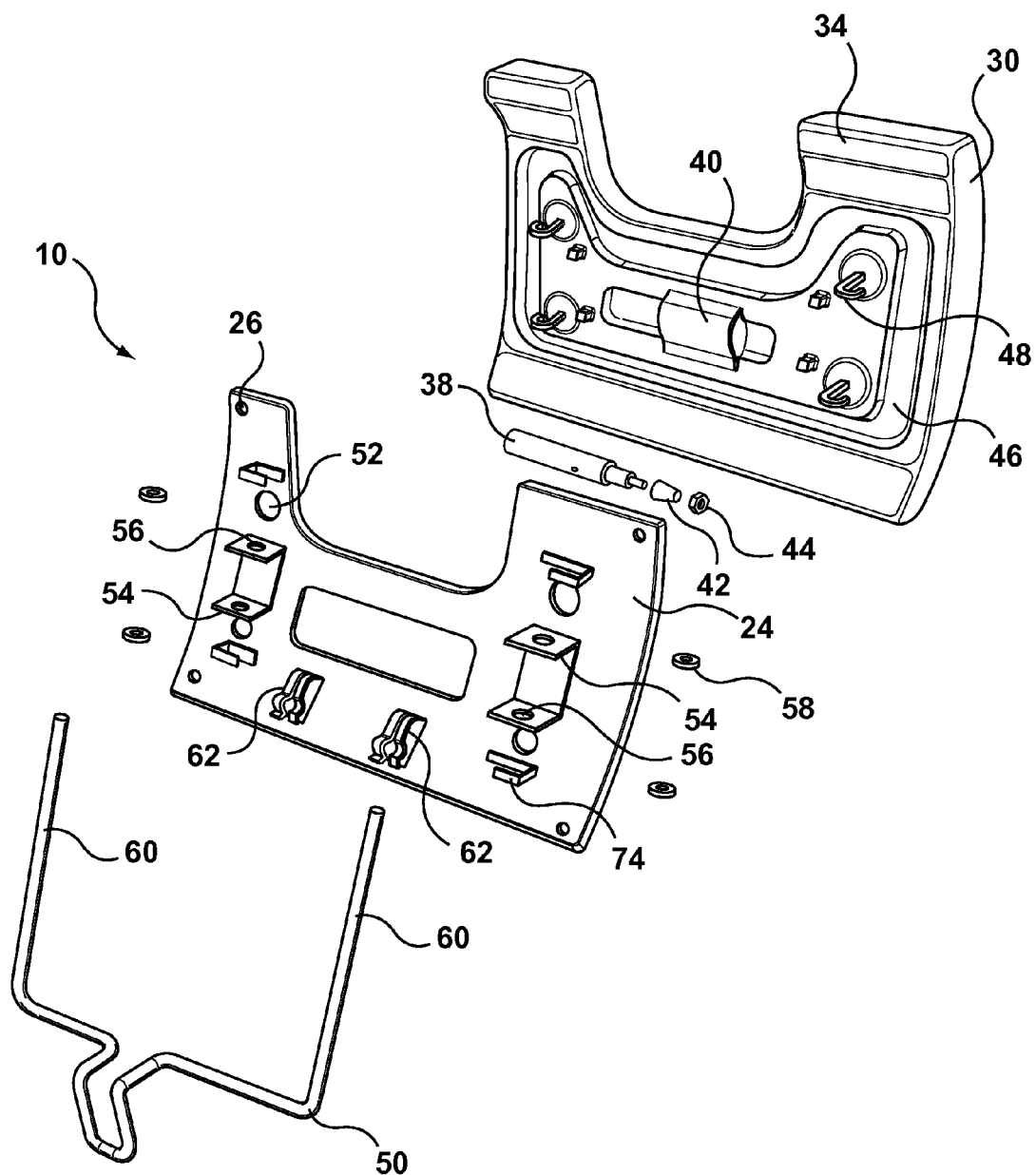
FIG. 4 is a exploded perspective view of an active bolster according to an embodiment of the invention.

Turning now to FIG. 4, provided is an exploded view of active bolster 10 comprising a first embodiment of the releasable engagement mechanism. As shown, active bolster 10 includes hollow chamber 30, reaction plate 24 and inflator 38. During assembly, inflator 38 is mounted in inflator housing 40 using retaining nut 44, so as to be in fluid communication with the interior volume of hollow chamber 30. In some embodiments, a diffusion cap 42 may also be incorporated to reduce excessive gas impingement upon the bladder wall. Also visible on front panel 34 of hollow chamber 30 is the series of deformable features 46 (e.g. ribs, pleats, creases or surface irregularities) that permit hollow chamber 30 to volumetrically expand upon inflation during a crash event.

The releasable engagement mechanism is configured to permit easier detachment of hollow chamber 30 from reaction plate 24 during servicing, for example to gain access to inflator 38, and/or associated components such as the electrical harness and connections. The releasable engagement mechanism generally provides a plurality of hooks 48 extending forwardly from front panel 34, and a mounting rod 50 releaseably retained on the forward side of reaction plate 24. On assembly (as detailed in FIG. 5a), hooks 48 are configured to pass though respective holes 52 provided in reaction plate 24, enabling engagement of hooks 48 with mounting rod 50, thereby affixing hollow chamber 30 to reaction plate 24. Also provided on the forward surface of reaction plate 24 is suitable hardware to ensure proper alignment and retention of mounting rod 50 when installed. For example, the forward surface of reaction plate 24 may be configured with at least one rod mount feature or bracket 54 that presents one or more rod alignment surfaces 56. As shown, two rod mount brackets 54 are provided, each having two alignment surfaces 56. The alignment surfaces may be lined with suitable grommets or bushings 58 to facilitate passage/positioning of mounting rod 50 therethrough, as well as to reduce undesirable buzz, squeak and rattle, generally referred to in automotive acoustics as BSR. Exemplary materials for bushings 58 include, but are not limited to, rubber and polyimide. In other embodiments, bushing 58 may be lined with a secondary material, such as fiberglass. It will also be appreciated that bracket 54 may be provided in a number of configurations, such as the exemplary alternative arrangement shown in FIG. 5b. In this configuration, slots 80 are provided in bracket 54' for insertion of 'dumb-bell'-shaped bushing 58'. Bracket 54 may be provided as a separately formed element that is attached (e.g. welded) to reaction plate 24, or formed by way of cutouts where the bracket portions presenting alignment surfaces 56 are integral with reaction plate 24.

In the embodiment shown, mounting rod 50 is a U-shaped rod where each arm segment 60 is configured to engage hooks 48. To ensure that mounting rod 50 is retained in proper position relative to reaction plate 24, a suitable retainer or clip feature 62 may be used. In the embodiment shown in FIGS. 4 and 5a, a pair of disengageable clip retainers 62 are used to retain mounting rod 50 in position.

Figure 6A:
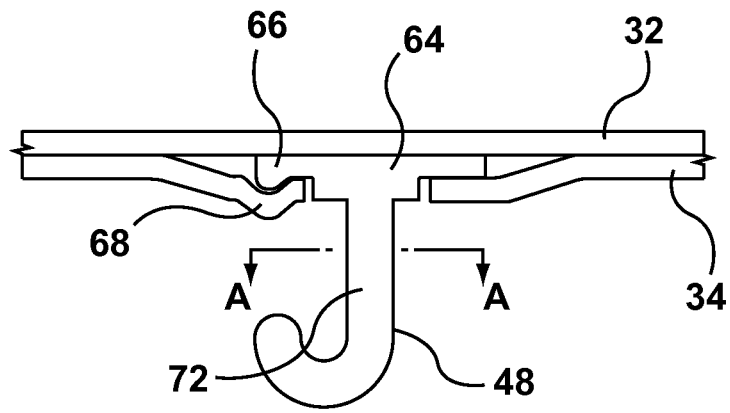
FIG. 6a is a partial sectional view of the hook provided on the hollow chamber.
Figure 6B:
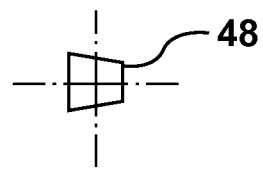
FIG. 6b is a sectional view of the hook of FIG. 6a through A-A.

As shown in the partial cross-sectional view of FIG. 6a, hook 48 is disposed between front panel 34 and rear panel 32, with a flange 64 being provided on hook 48 to anchor it in position. Where hollow chamber 30 includes separately formed injection molded front and rear panels, hook 48 is positioned between the panels during assembly of hollow chamber 30. Where hollow chamber 30 is blow molded, hook 48 may be separately formed and inserted molded into position. In some embodiments, flange 64 is provided with an indexing feature 66 to align with a corresponding front panel feature 68, so as to orient hook 48 in a desired orientation. For example, hook 48 may be oriented 90 degrees to the longitudinal orientation of mounting rod 50 to facilitate engagement. Hooks 48 may be made from a range of materials, including but not limited to metal and suitable polymers. In one non-limiting example, hooks 48 are made from polyamide. Hook 48 may be formed with a range of cross-sectional profiles depending on the desired performance characteristics. For example, as shown in the cross-section of FIG. 6b, hook 48 is provided with a tapered profile to enhance its load carrying capability.

Figure 7A:
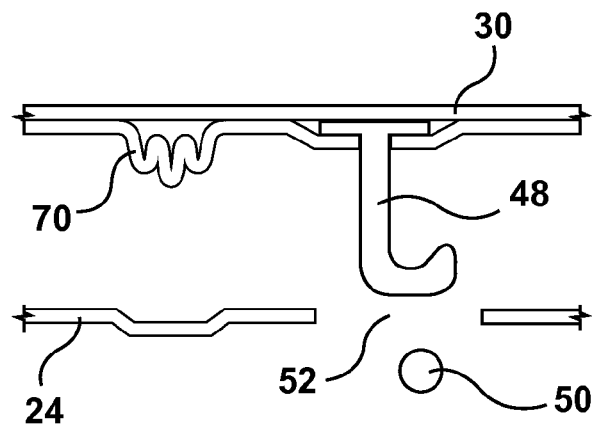
FIGS. 7a through 7d are partial cross-sectional views showing the process of installing the hollow chamber on the reaction plate, according to a first configuration of the hook.
Figure 7B:
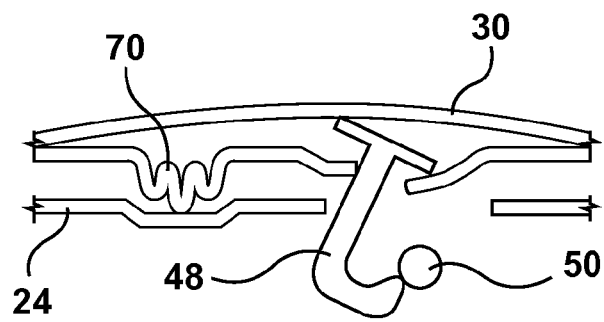
Figure 7C:
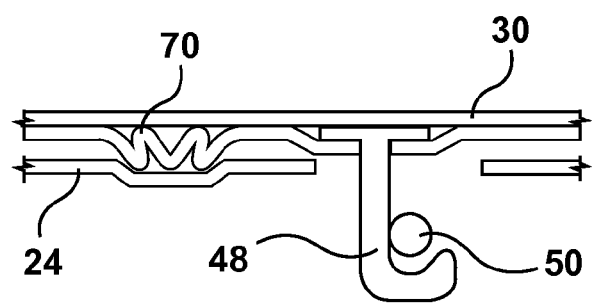
Figure 7D:
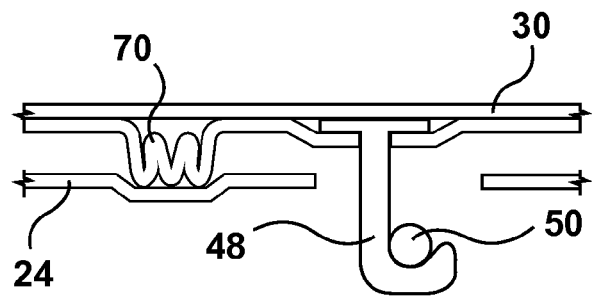

A partial side view representation of the mounting process of hollow chamber 30 to reaction plate 24 is shown in FIGS. 7a to 7d. In a first step (not shown), reaction plate 24 is attached to the vehicle by way of the energy absorbing brackets and suitable fasteners. Hollow chamber 30 is then attached to reaction plate 24 by aligning each hook 48 with the respective hole 52 in reaction plate 24, and applying forward pressure, that is inward pressure to drive hooks 48 towards mounting rod 50 (see FIG. 7a). Where hook 48 is provided as a substantially rigid structure, on further inward pressure, flange 64 of hook 48 angularly displaces between front panel 34 and rear panel 32, permitting sufficient lateral displacement of hook 48 to pass mounting rod 50 (see FIG. 7b). On sufficient inward movement and lateral displacement of hook 48, the head portion of hook 48 extends past mounting rod 50 and snaps into place (see FIG. 7c). During this process, a mount-facilitating protrusion 70 comes in contact with reaction plate 24 and is compressed. As such, once hook 48 snaps into position, protrusions 70 exert an outward pressure, such that upon releasing the forward pressure, hook 48 is urged outwardly in a manner that seats mounting rod 50 securely within hook 48 as shown in FIG. 7d. In this final position, the lateral portion of the hook is positioned immediately adjacent mounting rod 50.

Figure 8A:
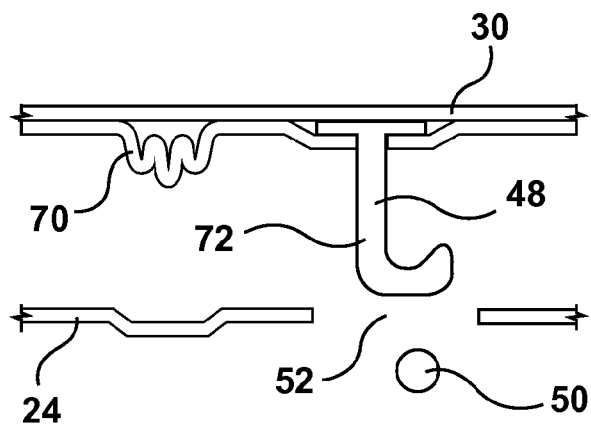
FIGS. 8a through 8d are partial cross-sectional views showing the process of installing the hollow chamber on the reaction plate, according to a second configuration of the hook.
Figure 8B:
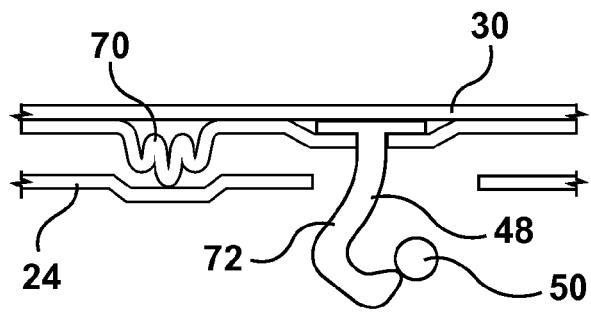
Figure 8C:
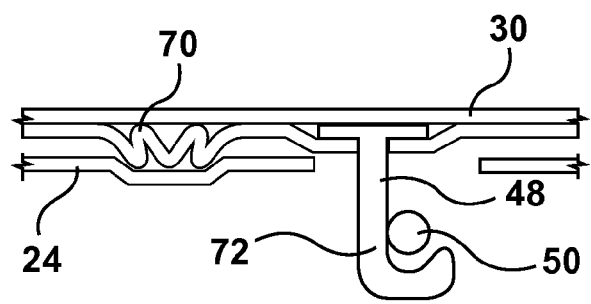
Figure 8D:
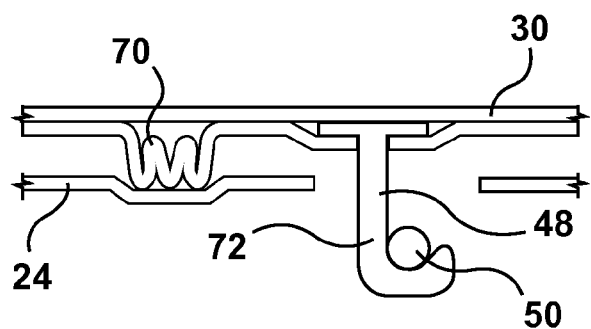

In another embodiment, for example as shown in FIGS. 8a to 8d, hooks 48 are formed of a material permitting angular displacement of the hook shaft 72. Once again, in a first step (not shown), reaction plate 24 is attached to the vehicle by way of the energy absorbing brackets and suitable fasteners. Hollow chamber 30 is then attached to reaction plate 24 by aligning each hook 48 with the respective hole 52 in reaction plate 24, and applying forward pressure, that is inward pressure to drive hooks 48 towards mounting rod 50 (see FIG. 8a). Where hook 48 is provided with a shaft 72 capable of lateral deflection or displacement, on further inward pressure, shaft 72 displaces sufficiently to permit passage of hook 48 around mounting rod 50 (see FIG. 8b). On sufficient inward movement and lateral displacement of hook 48, the head portion of hook 48 extends past mounting rod 50 and snaps into place (see FIG. 8c). During this process, mount-facilitating protrusion 70 comes in contact with reaction plate 24 and is compressed. As such, once hook 48 snaps into position, protrusions 70 exert an outward pressure, such that upon releasing the forward pressure, hook 48 is urged outwardly in a manner that seats mounting rod 50 securely within hook 48 as shown in FIG. 8d. In this final position, the lateral portion of the hook is positioned immediately adjacent mounting rod 50. In this embodiment, as hooks 48 are required to deflect during assembly, they are formed of a material exhibiting the required flex and memory to spring back into position.

To promote the outward pressure, the mount-facilitating protrusion 70 is provided with a ribbed surface. As will be appreciated, a plurality of mount-facilitating protrusions 70 may be provided between hollow chamber 30 and reaction plate 24.

Figure 5A:
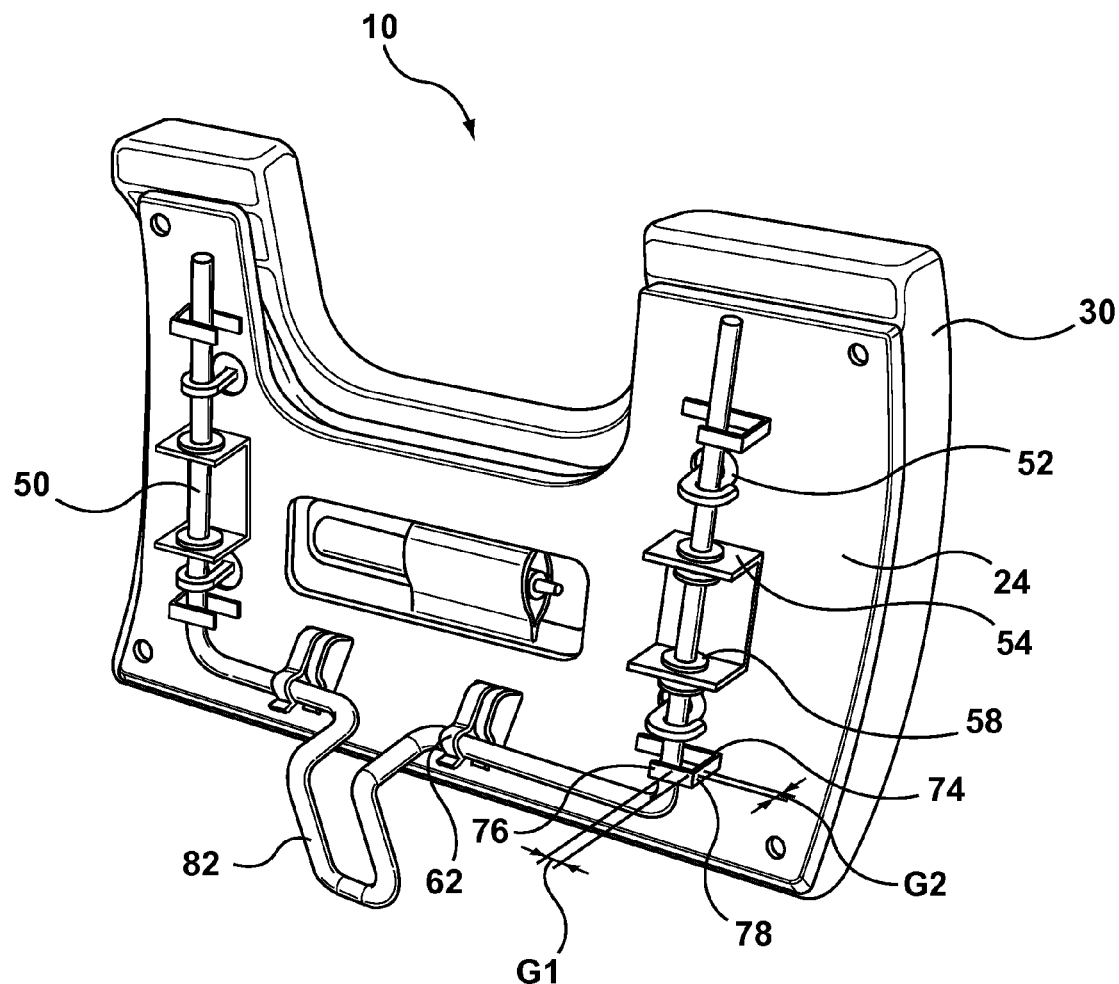
FIG. 5a is a perspective view of the active bolster of FIG. 4, in an assembled state.
Figure 5B:
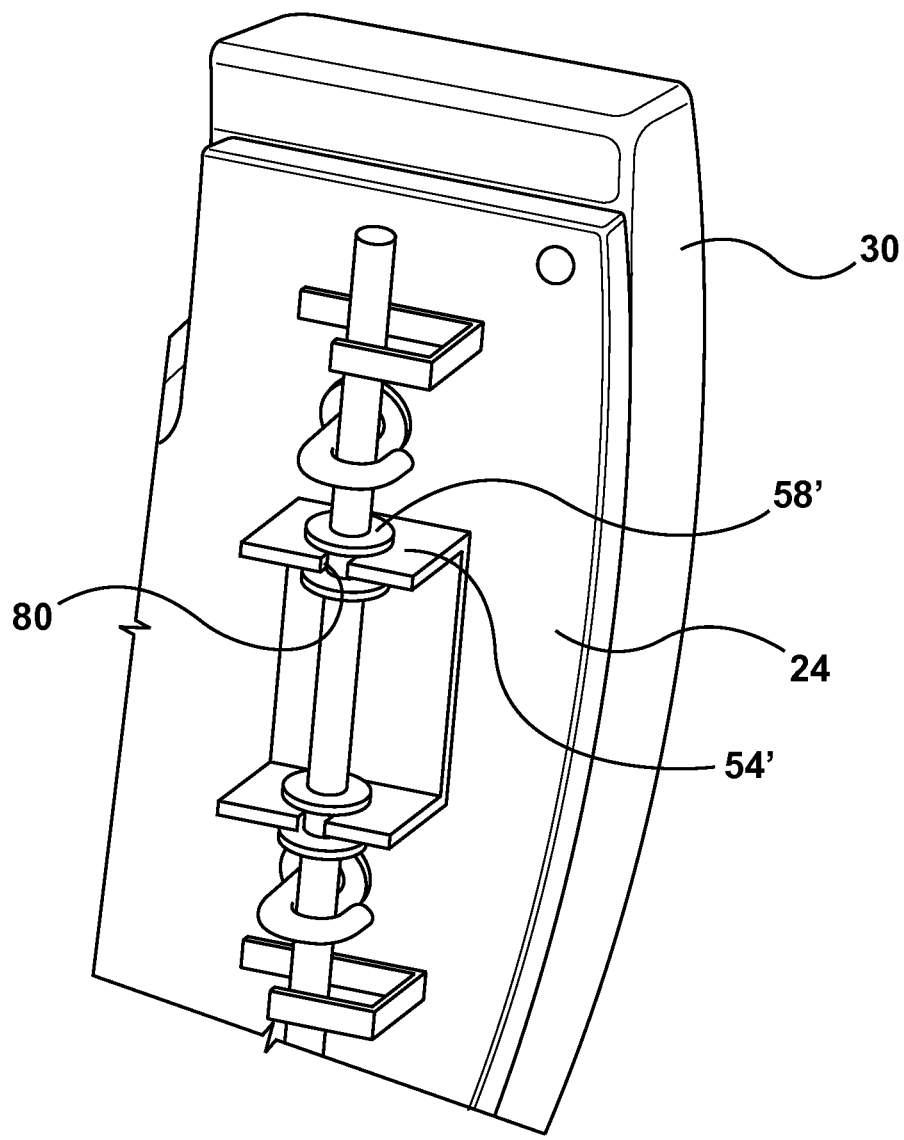
FIG. 5b is a perspective view of an alternate bracket arrangement for the active bolster of FIG. 4.

During the process of snapping hook 48 into place, there may be forward and/or lateral displacement of mounting rod 50. To counter this, as shown in FIGS. 4 and 5, the forward surface of reaction plate 24 further includes one or more U-shaped orientation features 74 that limit the forward and lateral displacement of mounting rod 50 during installation. In general, U-shaped orientation feature 74 provides a forward stop surface 76 and a lateral stop surface 78 that define the limit of deflection of mounting rod 50 (see FIG. 5a). Forward and lateral stop surfaces 76, 78 are set gap distances G1, G2, respectively, from mounting rod 50, where gaps G1 and G2 defines the maximum deflection permitted by mounting rod 50 during assembly.

With hollow chamber 30 affixed to reaction plate 24, active bolster 10 is ready for use. Although active bolster 10 is largely composed on non-moving components, there may arise an occasion to inspect and/or replace inflator 38. With active bolster 10, removal is facilitated by sliding mounting rod 50 out from reaction plate 24. More specifically, with the embodiment shown in FIG. 5, mounting rod 50 can be disengaged from clip retainer 62 and displaced downwardly through rod mount bracket 54, thus disengaging mounting rod 50 from hooks 48 on hollow chamber 30. On removal of mounting rod 50 from reaction plate 24, hollow chamber 30 can be freely released in the rearward direction, giving access to front panel 34, and thus inflator 38. As reaction plate 24 remains affixed to the energy absorbing bracket, upon removal of hollow chamber 30, the fasteners used to retain reaction plate 24 in position are accessible. If the region of the instrument panel forward of reaction plate 24 needs to be accessed, these fasteners can now be removed to permit removal of reaction plate 24 from the brackets. To permit for greater access to mounting rod 50 when active bolster 10 is fully installed, mounting rod 50 may be furnished with a handle 82.

Figure 9:
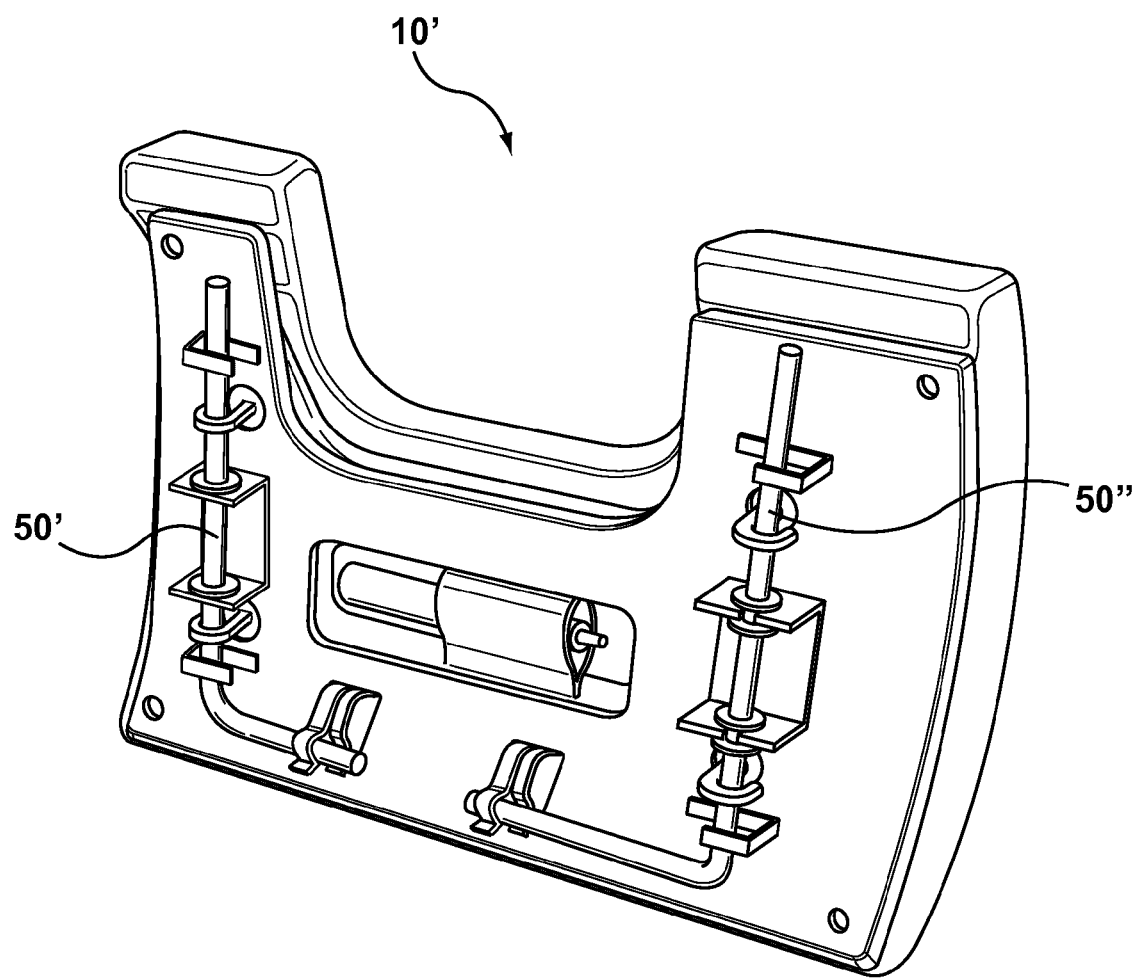
FIG. 9 is a perspective view of an alternate active bolster having a plurality of mounting rods.

In the embodiment detailed herein, mounting rod 50 is shown as a generally U-shaped structure, having a pair of arm segments 60. In other embodiments, such as active bolster 10' shown in FIG. 9, the mounting rod may be provided in the form of a plurality of separate mounting rods 50', 50".

As will be appreciated, the ability to install active bolster 10 by way of snap-in attachment has advantages. With many active bolster systems, the active bolster is installed with the instrument panel detached and separated from the vehicle. This permits for easier access behind the instrument panel, and thus to the standard fasteners (e.g. threaded fasteners) that are typically used to fasten the active bolster in position. The installation of bolsters (e.g. passive bolsters) after the instrument panel has been mounted in the vehicle, otherwise termed in-vehicle installation, has relied on the use of clips and/or screws on the A-surface. Such attachments, however, are generally insufficient to withstand deployment loads of active bolsters, and can fail during deployment. With the current active bolster system described herein, the hook-based snap-in attachment permits for a robust mount that can withstand deployment loads, yet is detachable by way of removal of the mounting rod. As such, the active bolster described herein is well suited for in-vehicle installation, yet is capable of being serviced when necessary.

In the embodiment detailed herein, active bolster 10 is configured in the form of an active knee bolster, and in particular a driver-side active knee bolster. As will be appreciated, the knee bolster may be configured for placement in a variety of alternate positions, such as for any of the passenger positions in a vehicle. Active bolster 10 may also be incorporated into a glove-box configuration, or alternatively in a variety of other active bolster applications, such as, but not limited to, head-rests, door pillars, driver and passenger-side doors, headliners and floors.

As will be appreciated, the shape of hollow chamber 30 detailed above is merely exemplary, as a variety of shapes may be implemented depending on the application. Hollow chamber 30 may further incorporate additional features, depending on the specific performance requirements. For example, hollow chamber 30 may additionally include vent holes to obtain a targeted deployment and energy absorption characteristic. Indexing features such as may also be incorporated, to ensure proper alignment, fit and finish.

While active bolster 10 has been exemplified in a vehicle generally in the form of an automobile, it will be appreciated that active bolster 10 may be used in a variety of vehicular types, including, but not limited to, other on-road motor vehicles, off-road vehicles, trucks, buses, vans, trains, airplanes, marine vehicles or amusement rides.

It is important to note that the construction and arrangement of the features in the various exemplary embodiments is illustrative only. Although only a few embodiments have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications changes and omissions may also be made in design, operating conditions and arrangement of the various exemplary embodiments without departing from the present scope of the invention. It will also be understood that each feature of each embodiment discussed herein, and of each reference cited herein, can be used in combination with the features of any other combination. All patents and publications discussed herein are incorporated by reference herein in their entirety.

What is claimed is:

1. An inflatable active bolster for a vehicle occupant, the active bolster comprising:
   a front panel and a rear panel, said front and rear panels being interconnected to form a hollow chamber, said front panel having deformable features that permit said hollow chamber to volumetrically expand upon inflation of said hollow chamber by an inflator; and
   a reaction plate for attachment of said active bolster to a suitable vehicle mount structure, wherein said hollow chamber is attached to said reaction plate through a releasable engagement mechanism,
   wherein said releasable engagement mechanism comprises a plurality of hooks provided on said front panel of said hollow chamber, said hooks being configured to engage one or more mounting rods provided on a forward surface of said reaction plate, and said hooks passing through respective holes provided in said reaction plate to engage said one or more mounting rods.

2. An inflatable active bolster for a vehicle occupant, the active bolster comprising:
   a front panel and a rear panel, said front and rear panels being interconnected to form a hollow chamber, said front panel having deformable features that permit said hollow chamber to volumetrically expand upon inflation of said hollow chamber by an inflator; and
   a reaction plate for attachment of said active bolster to a suitable vehicle mount structure, wherein said hollow chamber is attached to said reaction plate through a releasable engagement mechanism,
   wherein said releasable engagement mechanism comprises one or more hooks provided on said front panel of said hollow chamber, said hooks being configured to engage one or more mounting rods provided on a forward surface of said reaction plate, and
   wherein said one or more mounting rods are removable from said reaction plate, permitting for disengagement from said one or more hooks.

3. An inflatable active bolster for a vehicle occupant, the active bolster comprising:
   a front panel and a rear panel, said front and rear panels being interconnected to form a hollow chamber, said front panel having deformable features that permit said hollow chamber to volumetrically expand upon inflation of said hollow chamber by an inflator; and
   a reaction plate for attachment of said active bolster to a suitable vehicle mount structure, wherein said hollow chamber is attached to said reaction plate through a releasable engagement mechanism,
   wherein said releasable engagement mechanism comprises one or more hooks provided on said front panel of said hollow chamber, said one or more hooks being configured to engage a single mounting rod that is provided on a forward surface of said reaction plate to engage all of said one or more hooks.

4. An inflatable active bolster for a vehicle occupant, the active bolster comprising:
- a front panel and a rear panel, said front and rear panels being interconnected to form a hollow chamber, said front panel having deformable features that permit said hollow chamber to volumetrically expand upon inflation of said hollow chamber by an inflator; and
- a reaction plate for attachment of said active bolster to a suitable vehicle mount structure, wherein said hollow chamber is attached to said reaction plate through a releasable engagement mechanism,
- wherein said releasable engagement mechanism comprises one or more hooks provided on said front panel of said hollow chamber, said hooks being configured to engage one or more mounting rods provided on a forward surface of said reaction plate,
- wherein said one or more mounting rods are retained on said reaction plate through respective rod mount brackets provided on said forward surface of said reaction plate, and
- wherein said rod mount brackets are formed by way of cutouts, where said brackets are integral with said reaction plate.

5. An inflatable active bolster for a vehicle occupant, the active bolster comprising:
- a front panel and a rear panel, said front and rear panels being interconnected to form a hollow chamber, said front panel having deformable features that permit said hollow chamber to volumetrically expand upon inflation of said hollow chamber by an inflator; and
- a reaction plate for attachment of said active bolster to a suitable vehicle mount structure, wherein said hollow chamber is attached to said reaction plate through a releasable engagement mechanism,
- wherein said releasable engagement mechanism comprises one or more hooks provided on said front panel of said hollow chamber, said hooks being configured to engage one or more mounting rods provided on a forward surface of said reaction plate, and
- wherein said hooks comprise a flange that is anchored between said front and rear panels.

6. The active bolster according to claim 5, wherein upon installation of said hollow chamber on said reaction plate, said hooks laterally displace to allow passage around said one or more mounting rods, said hooks snapping into engagement upon sufficient installation force.

7. The active bolster according to claim 6, wherein said hooks are substantially rigid structures, said hooks laterally displacing on installation through angular displacement of said flange between said front and real panels of said hollow chamber.

8. The active bolster according to claim 6, wherein said hooks are formed of a material that permits for lateral displacement through lateral deflection of a shaft portion of said hooks.

* * * * *